United States Patent [19]

Barski et al.

[11] Patent Number: 5,050,229
[45] Date of Patent: Sep. 17, 1991

[54] METHOD AND APPARATUS FOR THINNING ALPHANUMERIC CHARACTERS FOR OPTICAL CHARACTER RECOGNITION

[75] Inventors: Lori L. Barski, Pittsford; Hin-Leong Tan, Rochester, both of N.Y.

[73] Assignee: Eastman Kodak Company, Rochester, N.Y.

[21] Appl. No.: 533,309

[22] Filed: Jun. 5, 1990

[51] Int. Cl.⁵ .............................. G06K 9/44
[52] U.S. Cl. ..................... 382/55; 382/47; 382/54
[58] Field of Search ................ 382/55, 47, 54

[56] References Cited

U.S. PATENT DOCUMENTS

| | | | |
|---|---|---|---|
| 3,196,398 | 7/1965 | Baskin | 340/146.3 |
| 3,668,637 | 6/1972 | Sakai et al. | 382/55 |
| 3,735,349 | 5/1973 | Beun et al. | 340/146.3 |
| 3,846,754 | 11/1974 | Oka et al. | 340/146.3 |
| 3,940,737 | 2/1976 | Beun et al. | 340/146.3 |
| 3,975,709 | 8/1976 | Beun et al. | 340/146.3 |
| 4,034,344 | 7/1977 | Saraga et al. | 340/146.3 |
| 4,115,760 | 9/1978 | Ito | 340/146.3 |
| 4,162,482 | 7/1979 | Su | 340/146.3 |
| 4,520,505 | 5/1985 | Yamamoto et al. | 382/55 |

FOREIGN PATENT DOCUMENTS 55-131876 3/1979 Japan .
62-160595 7/1987 Japan .

OTHER PUBLICATIONS

Hilditch, "Linear Skeletons from Square Cupboards," *Machine Intelligence*, Edinburgh University Press (1969) vol. 4, pp. 403–420.

*Primary Examiner*—David K. Moore
*Assistant Examiner*—David Fox
*Attorney, Agent, or Firm*—Dennis R. Arndt

[57] ABSTRACT

The width of each stroke in a character image is reduced one pixel at a time over a series of repetitive cycles until the number of cycles exceeds a predetermined number proportional to the thinnest character stroke observed in the character image. The process is then continued until the character has been skeletonized, but with the added constraint that the existing end point pixels of character strokes are retained.

19 Claims, 3 Drawing Sheets

METHOD AND APPARATUS FOR THINNING ALPHANUMERIC CHARACTERS FOR OPTICAL CHARACTER RECOGNITION

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrigh rights whatsoever.

1. Technical Field

The invention is related to pre-processing devices for optical character recognition systems and in particular to pre-processing devices which thin or skeletonize an image of an individual character to facilitate its recognition by an optical character recognition system.

2. Background Art

Various techniques are known in the art for thinning or skeletonizing images of patterns. Some of these techniques are directed specifically to thinning patterns of alphanumeric characters to facilitate their recognition by an optical character recognition system. Such techniques essentially strip away the outer boundary pixels of a character one layer at a time in repeated succession until the character has been sufficiently thinned. Many of these techniques avoid stripping away the end point of a character stroke under certain conditions in order to preserve the stroke. For example, Hilditch, "Linear Skeletons from Square Cupboards", *Machine Intelligence*, Vol. 4, Edinburgh University Press (1969) pp. 403-420 discloses thinning n image with the constraints that a pixel may not be erased if the erasure would change connectivity or if the pixel is an end point.

U.S. Pat. No. 3,975,709 (Beun et al.) discloses a character skeletonization process in which edge pixels of a character are detected by sensing their connectivity in a local neighborhood and are removed as long as such removal does not create a void in a character stroke. This process is repeated until a final repetition in which less than a threshold number of pixels are removed. Then, further repetitions of the process are performed with the added constraint that end points cannot be removed. One problem with this concept is that the shape of the skeletonized character thus generated may depend upon the sequence in which the character pixels are processed.

U.S. Pat. Nos. 3,735,349 (Beun et al.) and 4,034,344 (Saraga et al.) disclose similar concepts.

U.S. Pat. No. 3,940,737 (Beun) discloses a similar concept with an improvement directed to ameliorating the problem that the shape of the skeletonized character can depend upon the sequence in which the pixels are processed. This improvement comprises additional or repetitive testing of each pixel with respect to constraints against its removal. As in the previous references, these constraints are based upon the pixels in a local neighborhood. A disadvantage of this concept is that the additional or repetitive testing consumes additional processing time.

U.S. Pat. No. 4,162,482 (Su), U.S. Pat. No. 4,115,760 (Ito) and JP 62-160595 (Watanabe) disclose thinning processes employing different criteria during different cycles.

The main problem with such techniques is that the criteria for removing or not removing an end point of a character stroke bears no relationship to the desired results. For example, in some techniques similar to those disclosed in the publication by Hilditch referred to above, the end points are apparently preserved throughout the entire skeletonization process. As applied to alpha-numeric characters such as the letter "V", this creates distracting artifacts which may prevent the resulting thinned character from being recognized by an optical character recognition system. This may be seen by referring to the thinning sequence for the letter "V" starting with FIG. 1b and concluding with FIG. 1d. The end point 10 at the base of the letter "V" is preserved from the start (FIG. 1b) of this particular sequence as boundary pixels are removed in successive iterations, so that the letter V of FIG. 1b is converted to a letter Y in FIG. 1d. Such a result is unacceptable for optical character recognition.

The U.S. Patents to Buen et al. referred to above represent a limited improvement, in that they teach that during an initial part of the thinning process, end points are removed, provided that the connectivity criteria is not violated. Thus, starting with the letter V of FIG. 1a, all boundary pixels are removed in successive iterations until the letter has been reduced to the thinner image of FIG. 1b. Then, subsequent iterations of the boundary pixel removal step are performed with the restriction that end points may not be removed, generating the sequence of images of FIGS. 1c and 1d. In this example, the protection of the end points was begun too soon during the process. Thus, the transition point at which protection of the end pixels is begun during the thinning process is critical.

Buen et al. teaches that the protection of end points is begun during the process immediately upon the conclusion of a boundary pixel removing step at which the number of pixels actually removed was less than a predetermined threshold. There is no suggestion by Buen et al. of how to select the predetermined threshold to avoid the unacceptable results illustrated in the sequence of FIGS. 1a-1d. In the sequence of FIGS. 1a-1d, the threshold was set too high, so that the protection of end points was begun too early in the process.

If a way could be found to correctly select the point at which the protection of end points is begun during the boundary removal process, the result would be that of FIG. 2 instead of FIG. 1d. In the example of FIG. 2, the protection of the end points was not begun prematurely as in the preceding example.

The effect of beginning the protection of end points too late (or not at all) during the boundary pixel removal process is illustrated in the sequence of FIGS. 3a-3d illustrating the thinning of a letter "P". In this example, the vertical stroke 20 at the base of the "P" distinguishes the character from a letter "D". In this example, the vertical stroke 20 is somewhat thinner than the remainder of the "P", which can occur if the document containing the "P" is scanned at a high speed with a low resolution, for example. In order for an optical character recognition system to correctly recognize the thinned version of the "P", preservation of at least a distinguishing portion of the base vertical stroke 20 is critical.

In the sequence of FIGS. 3a-3d, the protection of end points is begun too late, so that the base vertical stroke 20 has been so shortened in the final thinned image of FIG. 3d that the P has been virtually converted to a letter D. This result would be reached in Buen et al. by setting their threshold number of removed pixels too high.

The ideal result is obtained by beginning the protection of end points immediately following the boundary pixel removal step of FIG. 3c. In FIG. 3c the length of the vertical base stroke 20 has been shortened to an acceptable length "a", and this length is preserved through the conclusion of the process with the result illustrated in FIG. 4.

From the foregoing, one solution might be to set the transition point at which the preservation of end points is begun to the step corresponding to that of FIG. 3c. However, while this may be the correct transition point for thinning a letter P in the sequence of FIGS. 3 and 4, it may not be the correct transition point for thinning the letter V in the sequence of FIGS. 1 and 2. Moreover, if a significant change in character size, thickness or font is encountered while scanning the document, the transition point previously selected will necessarily be incorrect for the subsequent characters.

Accordingly, there is a need for a method of determining the transition point in the thinning process at the preservation of end points is begun which avoids the formation of confusing artifacts such as that illustrated in FIG. 1d and avoids the excessive shortening of a character stroke as illustrated in FIG. 3d in a reliable and automatic manner.

DISCLOSURE OF THE INVENTION

In accordance with the thinning process of the invention, a certain character stroke width found in an individual unknown character is first determined. Then, a single layer of boundary pixels in a bit-map image of the character are all removed except for those boundary pixels whose removal would change connectivity in the image. This step is repeated a number of times corresponding to the number of pixels spanned by a given fraction of the certain character stroke width previously determined. At this point, a transition is made so that during subsequent repetitions of the boundary pixel removal step, all pixels which are end points of character strokes are protected from removal. The process concludes when the character image has been skeletonized.

In the preferred embodiment of the invention, the certain character stroke width is the minimum character stroke width found in the image and the given fraction is one half the minimum character stroke width.

By basing the transition point during the character thinning process at which the preservation of end point pixels is begun upon a character stroke width found in the current character image (e.g., one half the minimum stroke width of the character), the locations of such protected end points in the final skeletonized image are less likely to result in confusion of the original character with another character. Thus, the stem at the bottom of the letter "V" in FIG. 2 skeletonized by the invention is reduced (relative to the inferior result illustrated FIG. 1d) by at least one half the minimum stroke width of the original character of FIG. 1a. As a result, the letter "V" of FIG. 2 skeletonized by the invention is not as likely to be confused with the letter "Y" as in the prior art. Furthermore, the base stem 20 of the letter P of FIG. 4 skeletonized by the invention is increased (relative to the inferior result illustrated in FIG. 2d) to its original length minus no more than the minimum stroke width of the original character of FIG. 2a and in most cases minus half the minimum stroke width, depending upon how the boundary pixel removal is implemented. As a result, the letter "P" of FIG. 4 skeletonized by the invention is not as likely to be confused with the letter "D" as in the prior art.

BRIEF DESCRIPTION OF THE DRAWINGS

The preferred modes of the invention are described in detail with reference to the accompanying drawings, of which.

MODES FOR CARRYING OUT THE INVENTION

Figure 5:
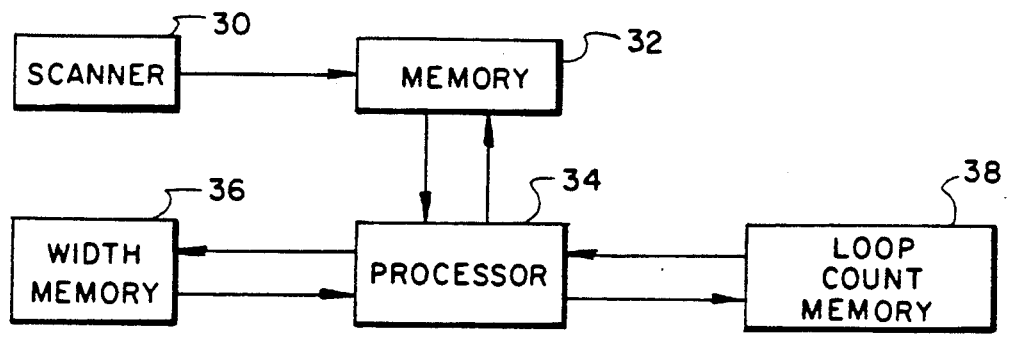
FIG. 5 is a simplified block diagram of a system embodying the invention.

Referring to FIG. 5, a system embodying the invention includes a document scanner 30 which transmits individual bit map character images to a memory 32. A thinning processor 34 thins each image stored in the memory 32. However, the processor 34 begins by first determining a character stroke thickness typical of the current character image and stores this thickness in a width memory 36 in terms of a pixel count. The processor 34 then removes each layer of boundary pixels from the image, with the constraint that any boundary pixel whose removal would change connectivity in the character image is not removed. The processor 34 increments the contents of a loop count memory 38 with the removal of each successive layer of boundary pixels. As soon as the loop count memory contents equals a predetermined fraction of the count stored in the stroke width memory 36, the processor 34 continues removing subsequent layers of boundary pixels from the image, but with the additional constraint that no end point pixels are removed.

The process performed by the system of FIG. 5 will now be described by reference to FIG. 6. The first step is to store the current character image in the memory 32 and determine a certain character stroke width w which is found in the character (block 40 of FIG. 6). (In the preferred embodiment, this certain stroke width is the minimum character stroke width found in the character.) Then, the loop count stored in the memory 38 is initialized to 1 (block 42). If the loop count is less than w', a predetermined fraction of w, (TRUE branch of block 44), a layer consisting of all boundary pixels or "border points" of the object in the image stored in the memory 32 are erased (block 46 of FIG. 6). However, any pixel whose removal would break a connection in the character image is not removed during this step. Boundary pixels whose removal would not break a connecting in the character image are referred to a "simple" border points.

In the preferred embodiment, the character image is a bi-tonal image in which each pixel is either "ON" or "OFF". The character in the image consists of an object of "ON" pixels in a field of "OFF" pixels. The boundary pixels are the "ON" pixels lying on the edge of the object. Erasing a pixel consists of converting an "ON" pixel to an "OFF" pixel. In the step of block 46, boundary pixels are located using conventional techniques as exemplified in the references discussed previously herein. Whether removal of a particular boundary pixel would break a connection in the image is also determined using conventional techniques as exemplified in the referenced discussed previously herein. For example, a determination is made for each "ON" pixel on the boundary of the character whether its immediate neighbors form a single object when the pixel is turned "OFF". If not, erasure of the pixel of interest would break a connection and therefore its removal is prevented.

Figure 1A:
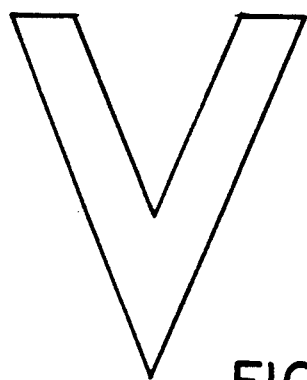
FIGS. 1a–1d illustrate a first exemplary thinning process in accordance with the prior art.
Figure 1B:
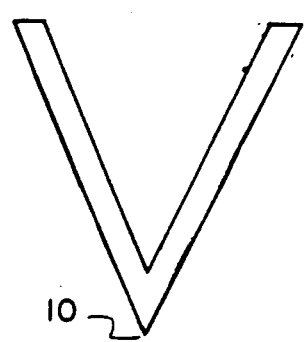
Figure 1C:
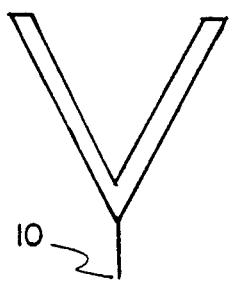
Figure 1D:
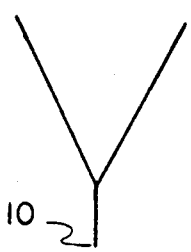
Figure 2:
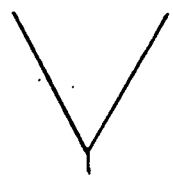
FIG. 2 illustrates the results of a thinning process in accordance with the invention.
Figure 3A:
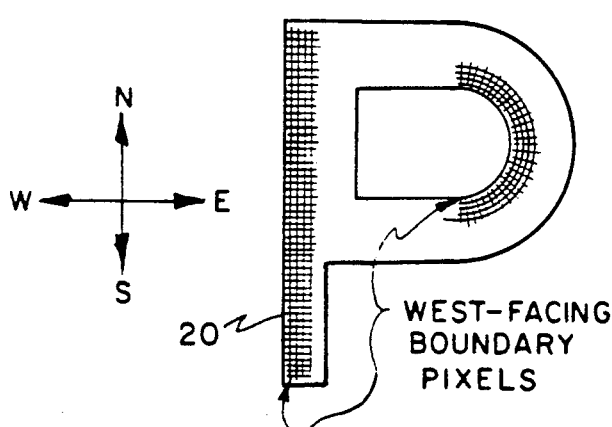
FIGS. 3a–3d illustrate a second exemplary thinning process in accordance with the prior art.
Figure 3B:
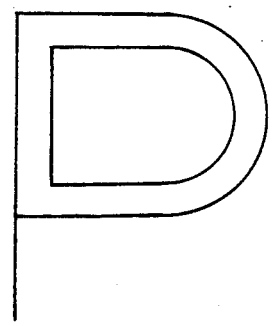
Figure 3C:
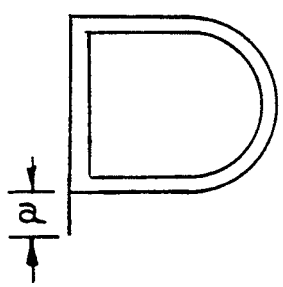
Figure 3D:
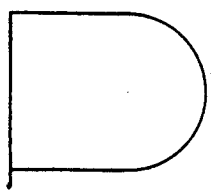
Figure 4:
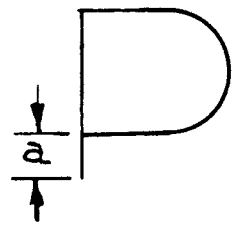
FIG. 4 illustrates the results of a thinning process in accordance with the invention.

In the preferred embodiment, the removal step of block 46 is performed in only two of four possible directions, N, S, E and W indicated in FIG. 3a, namely the N and E directions. Thus, in the step of block 46, only the "north" and "east"-facing boundaries of a square object would be affected. This prevents the width of a given character stroke from being reduced by more than one pixel in a single iteration of the process of FIG. 6.

Figure 6:
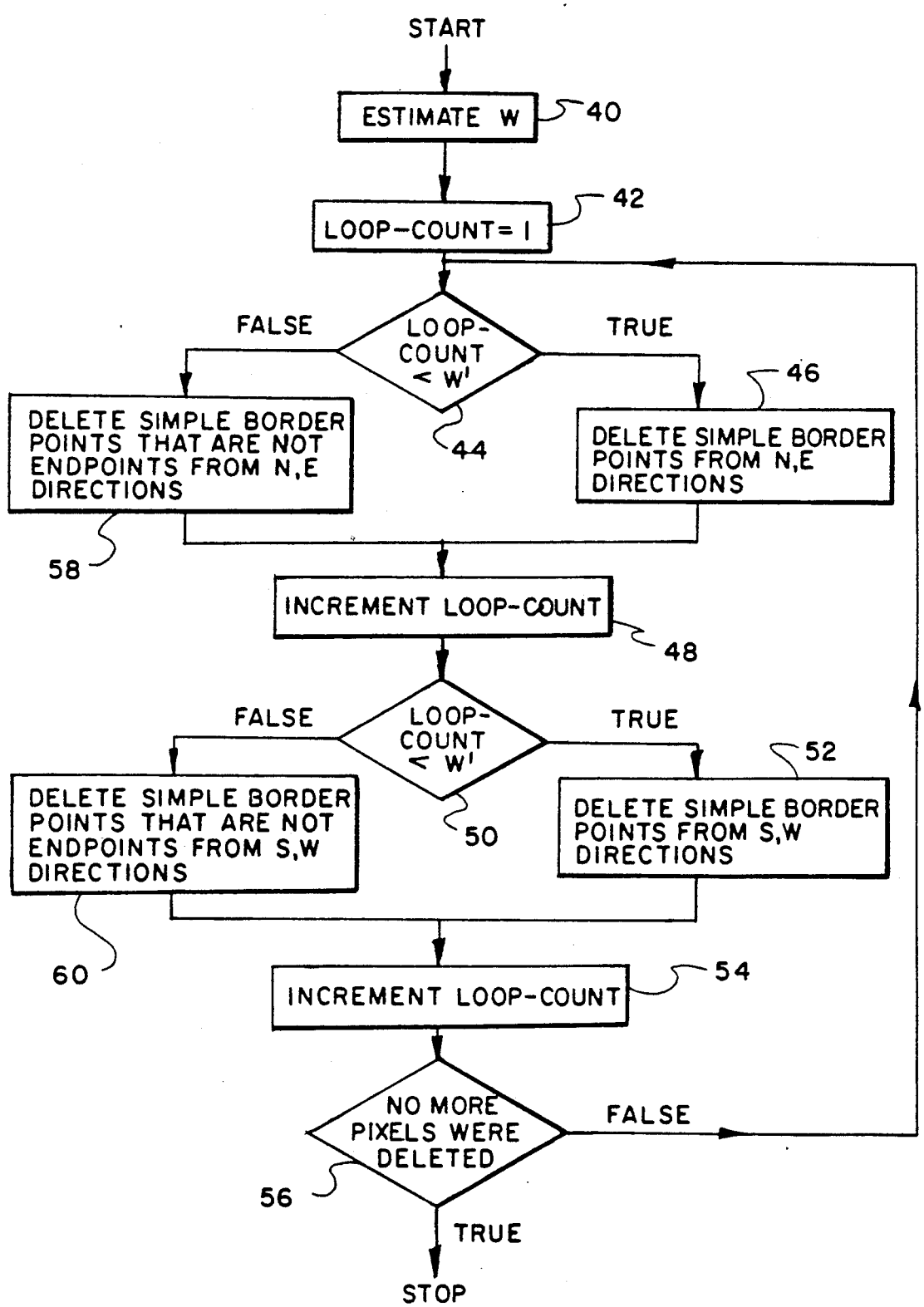
FIG. 6 is a flow diagram illustrating the process performed by the system of FIG. 5.

The loop count stored in the memory 38 is incremented at this point (block 48 of FIG. 6). If the loop count is still less than $w'$ (TRUE branch of block 50), a boundary pixel removal step similar to that of block 46 is performed, except that the removal is performed in the S and W directions only (block 52). As an example, a single layer of west-facing boundary pixels are so labeled in the character image of FIG. 3a. The loop count is again incremented (block 54). At this point, if the previous removal step failed to remove any pixels, the process is deemed to be complete (TRUE branch of block 56). Otherwise (FALSE branch of block 56), the process returns to the step of block 44.

At the step of block 44, if the loop count is found to be not less than $w'$ (FALSE branch of block 44), a boundary pixel removal step similar to that of block 46 is performed, except that no boundary pixels which are end points are removed in this step (block 58). The process then returns to the step of block 48 and continues in the manner described above.

At the step of block 50, if the loop count is found to be not less than $w'$ (FALSE branch of block 50), a boundary pixel removal step similar to that of block 52 is performed, except that no boundary pixels which are end points are removed in this step (block 60). The process then returns to the step of block 54 and continues in the manner described above.

Figures 7, 8:
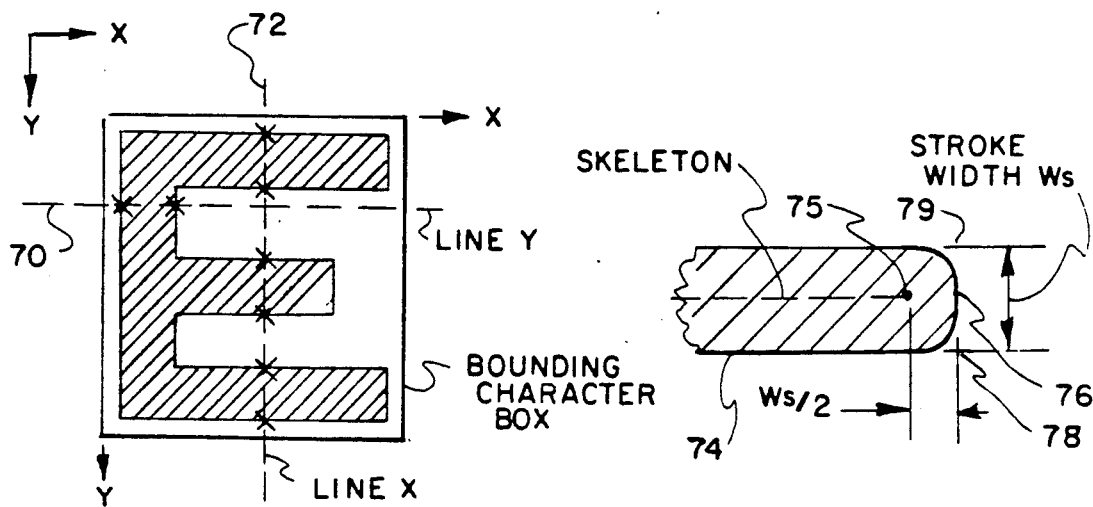
FIG. 7 is a pictorial diagram depicting how a typical character stroke width is determined in accordance with an exemplary embodiment of the invention.
FIG. 8 is a pictorial diagram illustrating an advantage of the invention.

In the preferred embodiment of the invention, w is determined by the processor 34 as the smallest character stroke width found in the current character image stored in the memory 32 and $w' = w/f$, where $f = 2$ in the preferred embodiment. FIG. 7 illustrates the preferred method of determining w. Horizontal and vertical intercept lines 70, 72 are superimposed on the character image (which in the case of FIG. 7 is the image of a letter "E"). The locations along each intercept line 70, 72 of each intersection with a boundary of a character stroke is noted and the distance between each pair of intersections spanning a character stroke is determined. The intersections or "intercepts" are indicated in FIG. 7 by X's. From all of the distances thus determined from a given character image, a particular character stroke width w is determined. In the preferred embodiment, w is the smallest of these distances, or the minimum character stroke width.

FIG. 8 illustrates the advantage of setting $w' = w/2$. A character stroke 74 of width $w_S$ surrounds its skeleton line image (indicated by dashed line). The end point 75 of the skeleton is preferably set back from the actual end 76 of the character stroke 74 by $w_S/2$ because the character stroke width decreases near the stroke end 76 by virtue of the rounding of the corners 78, 79 of the stroke 74. Setting $w' = w_S/2$ will preserve the end point 75 of the skeleton through successive boundary pixel removal steps.

Figure 9:
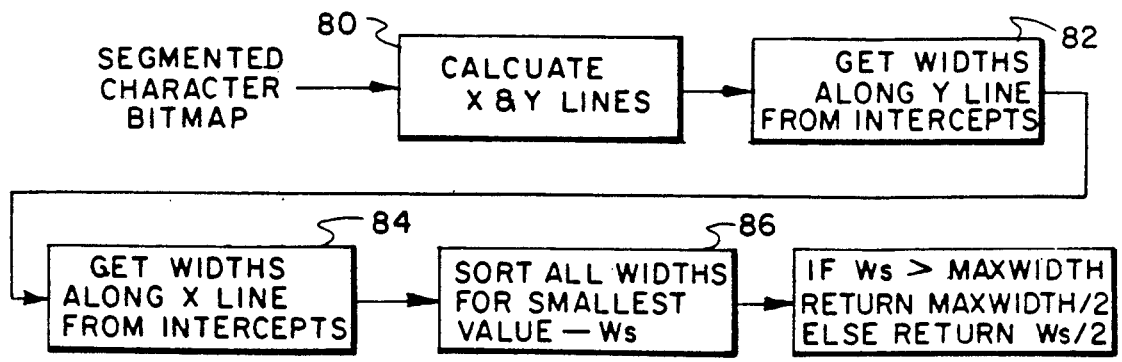
FIG. 9 is a flow diagram illustrating the steps performed by the system of FIG. 5 to determine a transition point in the process of FIG. 6.

The process for determining $w'$ is illustrated in FIG. 9. The locations of the intercept lines 70, 72 are computed (block 80 of FIG. 9). Then, the distances between pairs of intersections spanning individual character strokes are computed along the horizontal intercept line 70 (block 82) and along the vertical intercept line 72 (block 84). These distances are all sorted to find the shortest distance $w_S$ (block 86). The value $w' = w_S/2$ is then stored in the width memory 36 in terms of the number of pixels spanned by the width $w'$. However, if $w_S$ exceeds a predetermined maximum character stroke width, then the predetermined maximum character stroke width is stored in the width memory 36 instead of $w'$. The predetermined width is a selected fraction of either the height or width of the character image, depending upon the anticipated font or shape of the character in the image.

A computer program which implements the invention is listed in C-language in Appendices A and B. The portion of the program in Appendix A performs the character thinning process of the invention (the process of FIG. 6). The portion of the program in Appendix B performs the computation of $w'$ (the process of FIG. 9).

INDUSTRIAL APPLICABILITY AND ADVANTAGES:

The invention is useful for thinning characters in preparation for optical character recognition. An advantage of the invention is that the characters thinned by the invention are relatively free of confusing artifacts characteristic of prior thinning processes.

While the invention has been described in detail by specific reference to its preferred embodiments, it is understood that variations and modifications thereof may be made without departing from the true spirit and scope of the invention.

APPENDIX A

Copyright 1990 Eastman Kodak Company

```
#include stdio.h
#include "[beato.ccr]header.h"
#include "[beato.neural]object.h"

#define CHAR_VAL      255     /* pixel value for a character */
#define NON_CHAR_VAL  0       /* non-char pixel value */
#define MSIZE         200     /* max # of rows of pixels */
#define NSIZE         200     /* max # of columns of pixels */
#define MAX_LIST      40000   /* max # of pixels that can be deleted in
                                 any scan direction */ extern   BOOLEAN   SecondLineBufPtr[500][4000];
BOOLEAN mask[3][3];
long int del_list[MAX_LIST][2];
int max_m, max_n;

Thin_Tan( startline,
      startcol,
      endline,
      endcol,
      ThinBufPtr,
      stroke_width)

BOOLEAN   *ThinBufPtr[];
int   startline, startcol, endline, endcol, stroke_width;
{
  long int pixels_removed, sum;
  int  i,j, w;
  long int scrape();
```

```c
int     width, height;
register int fasti, fastj;

width = endcol - startcol+6;
height = endline - startline+6;

for (fasti = 0; fasti < MSIZE; fasti++)
   for (fastj = 0; fastj < NSIZE; fastj++)
     ThinBufPtr[fasti][fastj] = NON_CHAR_VAL;

for (i = 3; i < height-3; i++)
{
   for (j = 3; j < width-3; j++)
   {
     ThinBufPtr[i][j] =
SecondLineBufPtr[startline+i-3][startcol+j-3];
   }
} init_list();
init_im(ThinBufPtr, height, width);

i = w = 0;

/* Repeat till no more pixels are deleted */
do{
   sum = 0;
   ++i;

if ( w < stroke_width ){
       /* for the first few iterations, allow "tail-end
pixels" to
``` be deleted */

```
        eastwards(ThinBufPtr, height, width, 1);
        pixels_removed = scrape(ThinBufPtr);
        sum += pixels_removed;
/*      printf("\n[%d]    eastwards    %ld    removed",i,
pixels_removed); */ southwards(ThinBufPtr, height, width, 1);
        pixels_removed = scrape(ThinBufPtr);
        sum += pixels_removed;
/*      printf("\n[%d]    southwards   %ld    removed",i,
pixels_removed); */
    ++w;
    }
    else {
    /* disallow the removal of "tail-end pixels" */
        eastwards(ThinBufPtr, height, width, 0);
        pixels_removed = scrape(ThinBufPtr);
        sum += pixels_removed;
/*      printf("\n[%d]    eastwards    %ld    removed",i,
pixels_removed); */ southwards(ThinBufPtr, height, width, 0);
        pixels_removed = scrape(ThinBufPtr);
        sum += pixels_removed;
/*      printf("\n[%d]    southwards   %ld    removed",i,
pixels_removed); */
    ++w;
    } if ( w < stroke_width ){
        /* for the first few iterations, allow "tail-end
``` pixels" to be deleted */
```
        westwards(ThinBufPtr, height, width, 1);
        pixels_removed = scrape(ThinBufPtr);
        sum += pixels_removed;
/*      printf("\n[%d]  westwards   %ld    removed",i, pixels_removed); */ northwards(ThinBufPtr, height, width, 1);
        pixels_removed = scrape(ThinBufPtr);
        sum += pixels_removed;
/*      printf("\n[%d]  northwards  %ld    removed",i, pixels_removed); */
    }
    else {
     /* disallow the removal of "tail-end pixels" */
        westwards(ThinBufPtr, height, width, 0);
        pixels_removed = scrape(ThinBufPtr);
        sum += pixels_removed;
/*      printf("\n[%d]  westwards   %ld    removed",i, pixels_removed); */ northwards(ThinBufPtr, height, width, 0);
        pixels_removed = scrape(ThinBufPtr);
        sum += pixels_removed;
/*      printf("\n[%d]  northwards  %ld    removed",i, pixels_removed); */
    }
  }
  while( sum != 0);

init_list()
{
   long int i;
```

```c
    for (i=0; i < MAX_LIST; ++i)
        del_list[i][0] = MSIZE;
} init_im( ThinBufPtr,max_m, max_n)
BOOLEAN *ThinBufPtr[];
int max_m, max_n;
/* place a border of non-character pixels around image */
{
    int i,j;

for (i=0; i<max_m; ++i)
        for(j=0; j<max_n; ++j)
            if( i==0 || i==max_m-1 || j==0 || j==max_n-1)
                ThinBufPtr[i][j] == NON_CHAR_VAL;
} long int scrape(ThinBufPtr)
BOOLEAN    *ThinBufPtr[];
{
    int i, j;
    long int count;

if( del_list[MAX_LIST - 1][0] != MSIZE){
        printf("\nerror :   max   number   of   delete   nodes exceeded");
        exit(0);
    }
    count = 0;

while ( del_list[count][0] != MSIZE){
        ThinBufPtr [ del_list[count][0] ][ del_list[count][1] ] = NON_CHAR_VAL;
        del_list[count][0] = MSIZE;
```

```
    ++count;
  } return(count);
}

/*
read_im()
{
  FILE *fp1, *fopen();
  char c,d, f1[80];
  int i,j,k;

printf("\nenter infile : ");
  scanf("%s",f1);
  printf("\nenter image size - #rows #cols : ");
  scanf("%d %d", &max_m, &max_n);
  printf("%d %d",max_m, max_n);
  if( max_m >= MSIZE || max_n >= NSIZE ){
    printf("\nerror : max dimensions (%d %d) exceeded",
MSIZE, NSIZE);
    exit(0);
  }
  fp1 =fopen(f1,"r");
  if(fp1==0 ){
    printf("\nfile error");
    exit(0);
  }
*/
  /* read image and undo bit-reversal */
/*  for (i=0; i < max_m; ++i)
    for(j=0; j < (max_n/8) ; ++j){
```

```
      c = getc(fp1);
      for(k=0; k < 8 ; ++k)
        im[i][j*8 + k] = 001 & ( c >> k ) ;
    }
  }
*/

/*
out_im()
{
  FILE *fp2, *fopen();
  char c,d, f2[80], reverse(), *str1, buf1[20];
  int i,j,k;

printf("\nenter outfile : ");
  scanf("%s",f2);
  str1 = buf1;
  sprintf(str1,"mrs=%4d",(max_n/8));
  fp2 = fopen(f2,"w",str1,"rfm=fix");
  if(fp2==0){
    printf("\nfile error");
    exit(0);
  }
*/
  /* perform bit_reversal and output image */
/*  for (i=0; i<max_m; ++i)
    for(j=0; j < max_n/8; ++j){
      c = 00;
      for (k=0; k<8; ++k){
        d = (im[i][j*8 +k] == 0)? 00 : 0200;
        c |= d;
        if( k < 7){
          c >>= 1;
          c &= 0177;
```

```
            }
          }
        putc(c, fp2);
      }
    }
  */ eastwards(ThinBufPtr, max_m, max_n, delete_tail)
  BOOLEAN   *ThinBufPtr[];
  int max_m, max_n, delete_tail;
  /****************************************************
   ******
     perform thinning operation in the east direction.
     note: tail-end pixels are allowed to be deleted when the
           variable delete_tail is set equal to 1.
   ****************************************************
   ******/
  {
    int i,j, num, neighbors;
    long int count;

count = 0;
    for (i=0; i < max_m; ++i)
      for(j = 0 ; j < max_n; ++j){ if( ThinBufPtr[i][j]==CHAR_VAL && ThinBufPtr[i][j-1]
  != CHAR_VAL){
          num = num_component(ThinBufPtr,i,j,&neighbors);
          if( delete_tail == 1 ){
            if( num <= 1){
              del_list[count][0] = i;
              del_list[count][1] = j;
              ++count;
```

```
                }
            }
            else{
                if( num <= 1 && neighbors != 1){
                    del_list[count][0] = i;
                    del_list[count][1] = j;
                    ++count;
                }
            }
        }
    }
} westwards(ThinBufPtr, max_m, max_n, delete_tail)
BOOLEAN   *ThinBufPtr[];
int max_m, max_n, delete_tail;
{
    int i,j, num, neighbors;
    long int count;

count = 0;
    for (i=0; i < max_m; ++i)
        for(j = max_n - 1 ; j >= 0; --j){ if( ThinBufPtr[i][j]==CHAR_VAL && ThinBufPtr[i][j+1] != CHAR_VAL){ num = num_component(ThinBufPtr,i,j,&neighbors);
                if( delete_tail == 1 ){
                    if( num <= 1){
                        del_list[count][0] = i;
                        del_list[count][1] = j;
                        ++count;
```

```
            }
         }
      else{
         if( num <= 1 && neighbors != 1){
            del_list[count][0] = i;
            del_list[count][1] = j;
            ++count;
            }
         }
       }
     }
   }
} southwards(ThinBufPtr, max_m, max_n, delete_tail)
BOOLEAN   *ThinBufPtr[];
int max_m, max_n, delete_tail;
{
   int i,j, num, neighbors;
   long int count;

count = 0;
   for(j = 0 ; j < max_n; ++j)
      for (i=0; i < max_m ; ++i){ if( ThinBufPtr[i][j]==CHAR_VAL && ThinBufPtr[i-1][j]
 != CHAR_VAL){
            num = num_component(ThinBufPtr,i,j,&neighbors);
               if( delete_tail == 1 ){
                  if( num <= 1){
                     del_list[count][0] = i;
                     del_list[count][1] = j;
                     ++count;
                  }
```

```
            }
        else{
           if( num <= 1 && neighbors != 1){
              del_list[count][0] = i;
              del_list[count][1] = j;
              ++count;
           }
        }
      }
    }
  }
} northwards(ThinBufPtr, max_m, max_n, delete_tail)
BOOLEAN   *ThinBufPtr[];
int max_m, max_n, delete_tail;
{
   int i,j, num, neighbors;
   long int count;

count = 0;
   for(j = 0 ; j < max_n; ++j)
      for (i=max_m-1; i >=0 ; --i){ if( ThinBufPtr[i][j]==CHAR_VAL && ThinBufPtr[i+1][j] != CHAR_VAL){
            num = num_component(ThinBufPtr,i,j,&neighbors);
            if( delete_tail == 1 ){
               if( num <= 1){
                  del_list[count][0] = i;
                  del_list[count][1] = j;
                  ++count;
               }
            }
```

```
      else{
         if( num <= 1 && neighbors != 1){
            del_list[count][0] = i;
            del_list[count][1] = j;
            ++count;
         }
      }
    }
  }
} num_component(ThinBufPtr,m,n,p_neighbors)
BOOLEAN *ThinBufPtr[];
int m,n, *p_neighbors;
{
  int i,j,label,past_label,k;

ThinBufPtr[m][n] = NON_CHAR_VAL;

label = *p_neighbors = 0;
  for ( i=0; i<3; ++i)
    for( j=0; j<3; ++j){ if( ThinBufPtr[ m+i-1][n+j-1] != CHAR_VAL)
         mask[i][j] = 0;
      else{
         ++(*p_neighbors);

past_label = check_neigh(i,j,&label);
         if( past_label == 0 )
            mask[i][j] = ++label;
         else
            mask[i][j] = past_label;
      }
    }
```

```
  ThinBufPtr[m][n] = CHAR_VAL;

return(label);
} check_neigh(i,j,p_label)
int i,j,*p_label;
{
  int ref, max;

ref = i*3 +j;

switch(ref){ case 0: return(0);

case 1: return( mask[0][0] );

case 2: return (mask[0][1] );

case 3: max = ( mask[0][1] >=  mask[0][0] )? mask[0][1]
: mask[0][0];
          return(max);

case 4: /* don't care; never occurs */
          printf("\nerror: case 4");
          exit(0);

case 5: max = ( mask[0][2] >= mask[0][1] )? mask[0][2]
: mask[0][1];
          return ( max );

case 6: return( mask[1][0] );
```

```
    case 7: max = ( mask[2][0] >= mask[1][0] )? mask[2][0]
: mask[1][0];
            if( max == mask[1][2] )
              return( max );
            else if ( max == 0 )
              return( mask[1][2] );
            else if ( mask[1][2] == 0 )
              return( max );
            else
              return( --(*p_label) );

case 8: max = ( mask[2][1] >= mask[1][2] )? mask[2][1]
: mask[1][2];
            return (max);

}
}
/*************************************************
***************/
```

APPENDIX B

Copyright 1990 Eastman Kodak Company

```
#define    MAXINTERCEPTS 20
Get_Stroke_Width (sline,
           scol,
           endline,
           endcol,
           widthptr)
int   sline, scol, endline, endcol, *widthptr;
{
int   width[MAXINTERCEPTS];
int   cnt, i, j, windex, Y,X;
```

```
BOOLEAN   done;

done = FALSE;
    cnt = windex = 0;
    for (i=0; i<MAXINTERCEPTS;i++) width[i]=0;
    i = scol;
    j = sline;
    Y = (int) ( (float)( ( (endline - sline)*0.3) + sline)
);
    X = (int) ( (float)( ( (endcol - scol)*0.5) + scol) );

while ( i < endcol && windex < MAXINTERCEPTS)
    {
        if ( SecondLineBufPtr[ Y ][i] == 0 &&
           SecondLineBufPtr[ Y ][i+1] != 0 )
        {
         i++;
         cnt++;
         while (SecondLineBufPtr[Y][i++] != 0) cnt++;
         width[windex++] = cnt;
         cnt = 0;
        }
        else
         i++;
    } while ( j < endline && windex < MAXINTERCEPTS)
    {
        if ( SecondLineBufPtr[ j ][X] == 0 &&
           SecondLineBufPtr[ j+1 ][X] != 0 )
        {
         j++;
         cnt++;
```

```
        while (SecondLineBufPtr[j++][X] != 0) cnt++;

width[windex++] = cnt;

cnt = 0;

} else j++;

}

/* The minimum width value in the array width is
returned */

*widthptr = 10000;

for (i = 0; i < windex; i++)

{ if (width[i] < *widthptr) *widthptr = width[i];

} if (*widthptr > 15) *widthptr = 7;

else

*widthptr = (int) (0.5 * *widthptr);

}
```

What is claimed is:

1. In an optical character recognition system, a character thinning pre-processor comprising:
  means for determining a certain character stroke width from a character image;
  thinning means for removing successive layers of boundary pixels including boundary pixels which are also end point pixels from said character image; and
  control means for preventing said means for removing from removing boundary pixels which are also end point pixels of said character image whenever the number of layers removed is at least equal to a predetermined fraction of said certain stroke width.

2. The pre-processor of claim 1 wherein said thinning means comprises means for removing boundary pixels along boundaries in said character image facing a pair of orthogonal directions as one of said layers and means for removing boundary pixels along boundaries in said character image facing a pair of opposing orthogonal directions as a next one of said successive layers.

3. The pre-processor of claim 2 wherein said control means comprises:
  means for counting the number of layers removed by said thinning means; and
  means for sensing whether said number is less than the number of pixels in said image spanned by said pre-determined fraction of said certain stroke width.

4. The pre-processor of claim 1 wherein said image is bi-tonal and wherein the character in said image is represented by "ON" pixels in a field of "OFF" pixels, and wherein said thinning means comprise means for converting said boundary pixels to "OFF" pixels.

5. The pre-processor of claim 1 wherein said means for determining said certain stroke width comprise:
  means for locating all intersections of a set of orthogonal intercept lines with the boundaries of said character image, and
  means for determining the distances between pairs of said intersections along each of said intercept lines spanning individual character strokes of said image.

6. The pre-processor of claim 5 wherein said means for determining said certain stroke width comprise means for determining the shortest one of said distances.

7. The pre-processor of claim 6 wherein said predetermined fraction of said certain stroke width equals half said shortest one of said distances.

8. The pre-processor of claim 1 wherein said thinning means comprises:
  means responsive whenever immediate neighboring pixels of one boundary pixel form more than one object upon removal of said one boundary pixel for preventing removal of said one boundary pixel.

9. The pre-processor of claim 9 wherein said control means comprise means for detecting whether said one boundary pixel comprises an end pixel, said means for detecting comprising:

means for determining whether only one of said neighboring pixels is "ON".

10. In an optical character recognition system, a character thinning pre-processor, comprising:
  thinning means for iteratively reducing the width of each character stroke in a character image by one pixel by the removal of boundary pixels including boundary pixels which are also endpoint pixels of character strokes in said image;
  control means responsive whenever said width has been reduced by a predetermined number of pixels for preventing said thinning means from removing boundary pixels which are end point pixels of character strokes in said image; and
  means for determining said predetermined number of pixels from said character image.

11. The pre-processor of claim 10 wherein said means for determining comprises means for determining a certain stroke width from character strokes in said image.

12. The pre-processor of claim 11 wherein said certain character stroke width is the smallest character stroke width in said image and wherein said predetermined number is a fraction of the number of pixels spanned by said smallest width.

13. In an optical character recognition system, a character thinning pre-processing method, comprising:
  determining a certain character stroke width from character strokes in a character image;
  removing successive layers of boundary pixels from said character image including boundary pixels which are also end point pixels of said character image until the number of layers removed equals or exceeds a predetermined fraction of said certain stroke width; and
  thereafter preventing removal of such end point pixels from said character image while removing successive layers of boundary pixels from said character image.

14. The method of claim 13 wherein said removing step comprises removing boundary pixels along boundaries facing a pair of orthogonal directions as one of said layers and then removing boundary pixels along edges of said character image facing a pair of opposing orthogonal directions as a next one of said successive layers.

15. The method of claim 14 wherein said preventing step comprises:
  counting the number of layers removed; and
  sensing whether said number is less than the number of pixels in said image spanned by said predetermined fraction of said certain stroke width.

16. The method of claim 13 wherein said image is bi-tonal and wherein the character in said image is represented by "ON" pixels in a field of "OFF" pixels, and wherein said removal step comprises converting said boundary pixels to "OFF" pixels.

17. The method of claim 13 wherein said step of determining said certain stroke width comprises:
  locating all intersections of a set of orthogonal intercept lines with character stroke boundaries in said character image; and
  determining the distances between adjacent pairs of said intersections spanning individual character strokes along each of said intercept lines.

18. The method of claim 17 wherein said step of determining said typical stroke width further comprises determining the shortest one of said distances.

19. The method of claim 13 wherein said step of removal comprises:
  preventing removal of a boundary pixel whenever immediate neighboring pixels of said boundary pixel form more than one object upon removal of said boundary pixel.

* * * * *